United States Patent
Chang

(10) Patent No.: US 8,106,886 B2
(45) Date of Patent: Jan. 31, 2012

(54) MOUSE WITH SCANNING MODULE

(75) Inventor: Keng-Ming Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 693 days.

(21) Appl. No.: 12/235,987

(22) Filed: Sep. 23, 2008

(65) Prior Publication Data

US 2009/0167686 A1    Jul. 2, 2009

(30) Foreign Application Priority Data

Dec. 27, 2007  (CN) .......................... 2007 1 0203465

(51) Int. Cl.
*G09G 5/08* (2006.01)

(52) U.S. Cl. ........................................ 345/166; 358/498

(58) Field of Classification Search .................. 345/166; 358/498, 473; 382/312, 313
See application file for complete search history.

(56) References Cited

U.S. PATENT DOCUMENTS

| 5,519,511 A * | 5/1996 | Tanahashi | 358/473 |
| 5,909,209 A * | 6/1999 | Dickinson | 345/163 |
| 6,513,717 B2 * | 2/2003 | Hannigan | 235/462.45 |

FOREIGN PATENT DOCUMENTS

CN    200983148 Y    11/2007

* cited by examiner

*Primary Examiner* — Kevin M Nguyen
*Assistant Examiner* — Sepideh Ghafari
(74) *Attorney, Agent, or Firm* — Altis Law Group, Inc.

(57) ABSTRACT

A mouse includes a body, and a scanner. The body includes a first surface, an opposite second surface, and a recess defined in the second surface. The scanner received in the recess includes a housing defining a scanning window, an optical scanning unit received in the housing and an imaging sensor package. The optical scanning unit includes a light source for emitting light through the scanning window towards an object to be scanned, a reflector for reflecting light from the object, and a lens module for focusing the reflected light from the object. The imaging sensor package is received in the housing and is configured for receiving the focused light and generating image data associated with the object.

18 Claims, 3 Drawing Sheets

MOUSE WITH SCANNING MODULE

BACKGROUND

1. Field of the Invention

The present invention relates to a mouse with a scanning module.

2. Description of the Related Art

With the increasing popularity of personal computers, peripheral devices, such as mice and scanners, are frequently enhanced. A mouse is used to control the coordinates of a cursor on the computer screen, while a scanner is used to generate a digital representation of an image for data input to the personal computer. However, a typical scanner is large in size and, as a result, not very portable.

DETAILED DESCRIPTION

Figure 1:
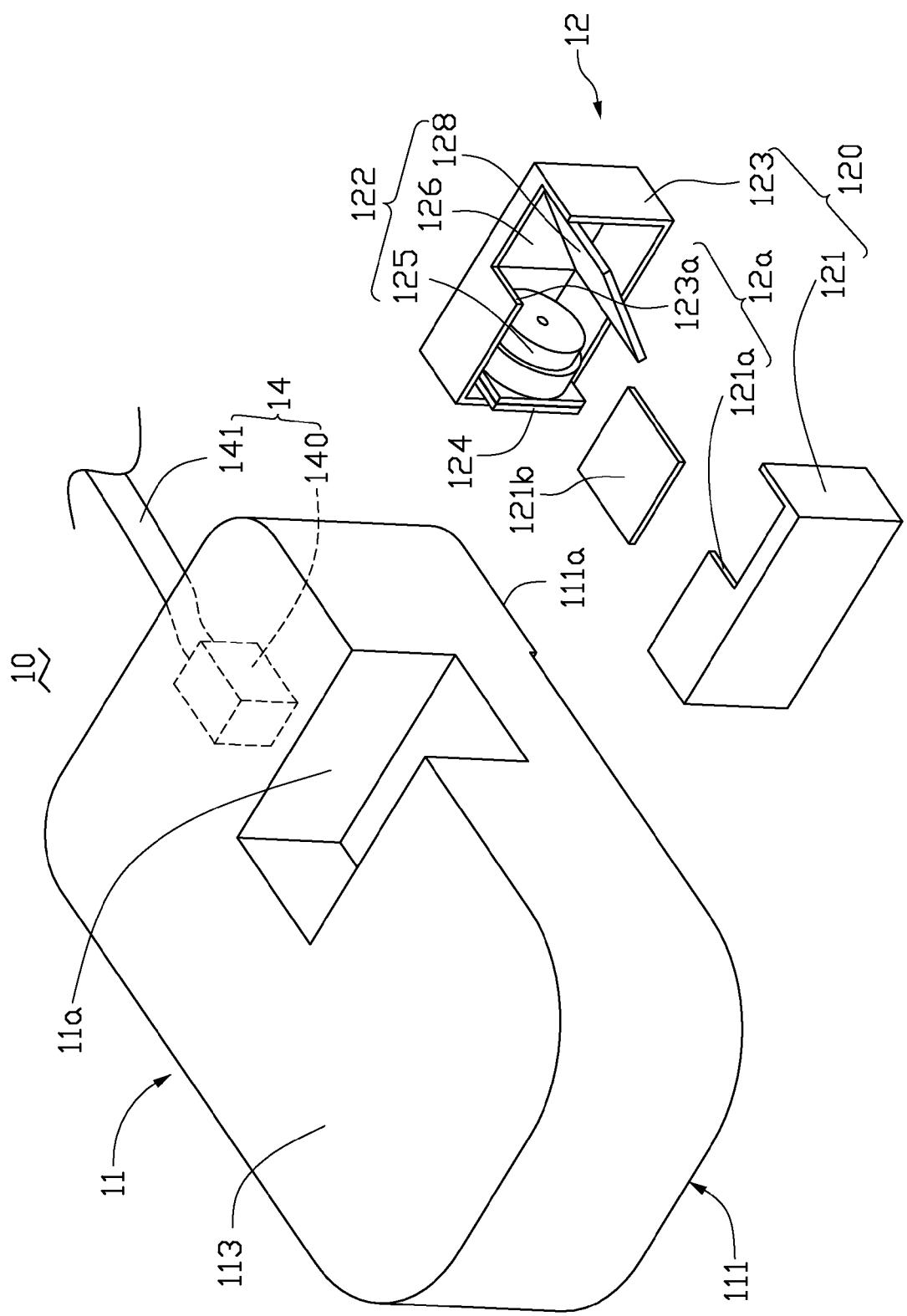
FIG. 1 is a partially disassembled isometric view of a mouse according to a first embodiment, in which a scanner is implemented.

Referring to FIG. 1, a mouse 10 according to a first embodiment is shown. The mouse 10 includes a body 11, a scanner 12, and a data sending module 14. The data sending module 14 is received in the body 11. In this embodiment, the data sending module 14 includes a control circuit 140 and a cable 141. One end of the cable 141 is electrically connected to the control circuit 140, while the other end is electrically connected to a host of a personal computer (not shown). The control circuit 140 is configured for receiving data and sending out data via the cable 141. In other embodiments, the data sending module 14 may include a control circuit and a wireless sending unit, wherein the control circuit is configured for receiving the data and the wireless sending unit is configured for sending out the data wirelessly.

The body 11 includes a first surface 111, and a second surface 113 opposite to the first surface 111. The body 11 further defines a recess 11a on the second surface 113 and is capable of accommodating the scanner 12. The second surface 113 is adjacent to or contacts an object to be scanned (not shown). The mouse 11 further includes at least one click button 111a arranged on the first surface 111 thereof.

The scanner 12 includes a housing 120, an optical scanning unit 122, and an imaging sensor package 124. The housing 120 includes a first portion 121 and a second portion 123. The first portion 121 and the second portion 123 cooperatively form a receiving space within the housing 120. The optical scanning unit 122 and the imaging sensor package 124 are received in the receiving space of the housing 120. The imaging sensor package 124 is electrically connected to the control circuit 140.

The first portion 121 defines a first opening 121a, and the second portion 123 defines a second opening 123a corresponding to the first opening 121a. The first opening 121a and the second opening 123a cooperatively form a scanning window 12a. The scanner 12 further includes a transparent plate 121b for enclosing the scanning window 12a, which protects the optical scanning unit 122 and the imaging sensor package 124 from dust and humidity.

The optical scanning unit 122 includes a plane light source 126, a reflector 128, and a lens module 125. The plane light source 126 is attached to an inner wall of the second portion 123 and is adjacent to the scanning window 12a. Alternatively, the plane light source 126 may be attached to an inner wall of the first portion 121. The reflector 128 is perpendicular to the plane light source 126 and faces the scanning window 12a. The reflector 128 may be inclined to the scanning window 12a at a 45-degree angle. The lens module 125 is arranged in a light path of incident light from the scanning window 12a reflected by the reflector 128. The lens module 125 may include at least one lens received therein and is attached to the imaging sensor package 124. The lens module 125 focuses light to the imaging sensor package 124. The imaging sensor package 124 may include a solid sensor, such as a charged coupled device (CCD) or a complementary metal oxide semiconductor (CMOS), for receiving the focused light.

Figure 2:
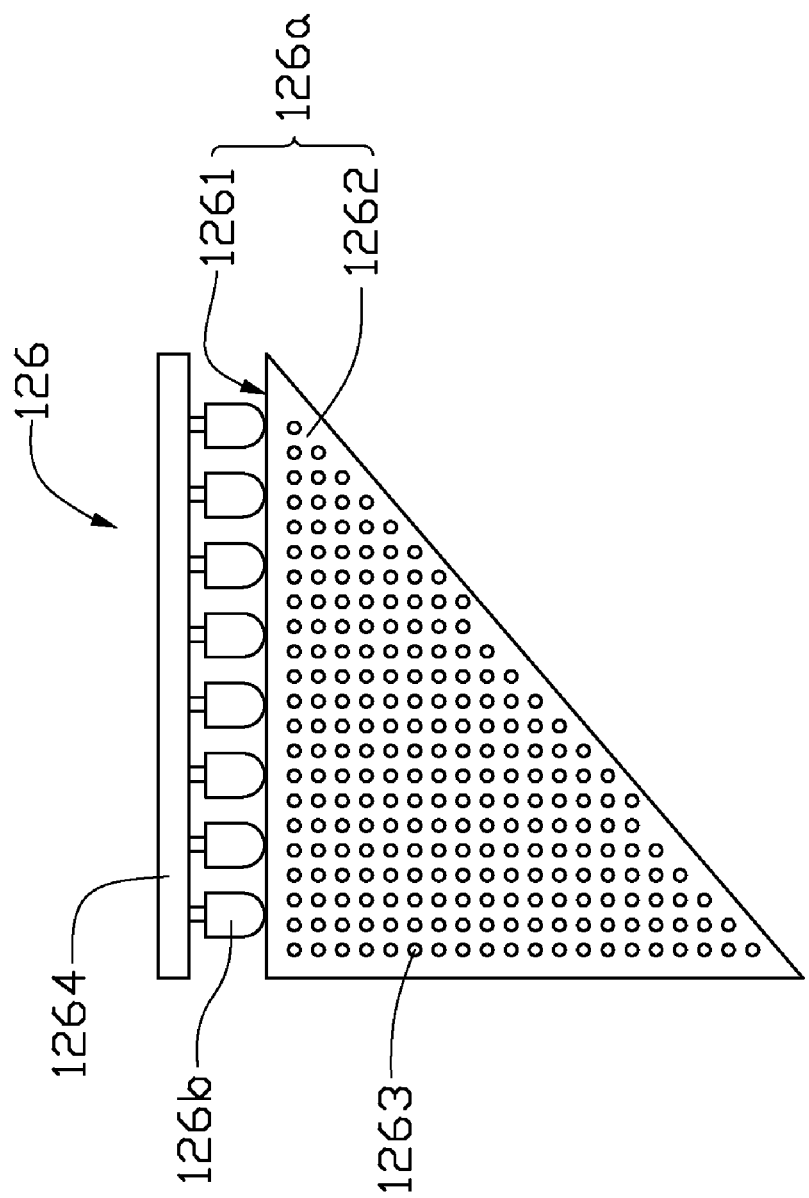
FIG. 2 is a schematic view of a light source of the scanner of FIG. 1.

Referring to FIG. 2, the plane light source 126 includes a light diffusing plate 126a and an array of light emitting diodes 126b (LED). The array of LEDs 126b is electrically connected to a circuit board 1264. The light diffusing plate 126a may be made of polymethyl methacrylate (PMMA) and includes a light incident surface 1261 and a light emitting surface 1262 perpendicular to the light incident surface 1261. The array of LEDs 126b faces the light incident surface 1261. Numerous half-ball-shaped protrusions 1263 are formed on the light emitting surface 1262 in a matrix fashion. The protrusions 1263 may be integrated with the light diffusing plate 126a by an injection molding method. The circuit board 1264 is electrically connected to the control circuit 140.

When the scanner 12 is activated by a mouse click of an icon associated to a scanning program in a personal computer, the array of LEDs 126b emits light. The light emitted is coupled to the light incident surface 1261, diffused by the protrusions 1263, and emitted from the light emitting surface 1262 of the light diffusing plate 126a towards the reflector 128. The reflector 128 reflects the light emitted from the light emitting surface 1262 towards an object (not shown) to be scanned via the scanning window 12a. Light reflected by the object is reflected by the reflector 128 and propagated towards the lens module 125. The imaging sensor package 124 receives light through the lens module 125 and generates image data associated with the object via the photoelectric conversion of the imaging sensor package 124. As the object has been scanned, the corresponding image data may be transmitted to the personal computer using the control circuit 140 and the cable 141.

Figure 3:
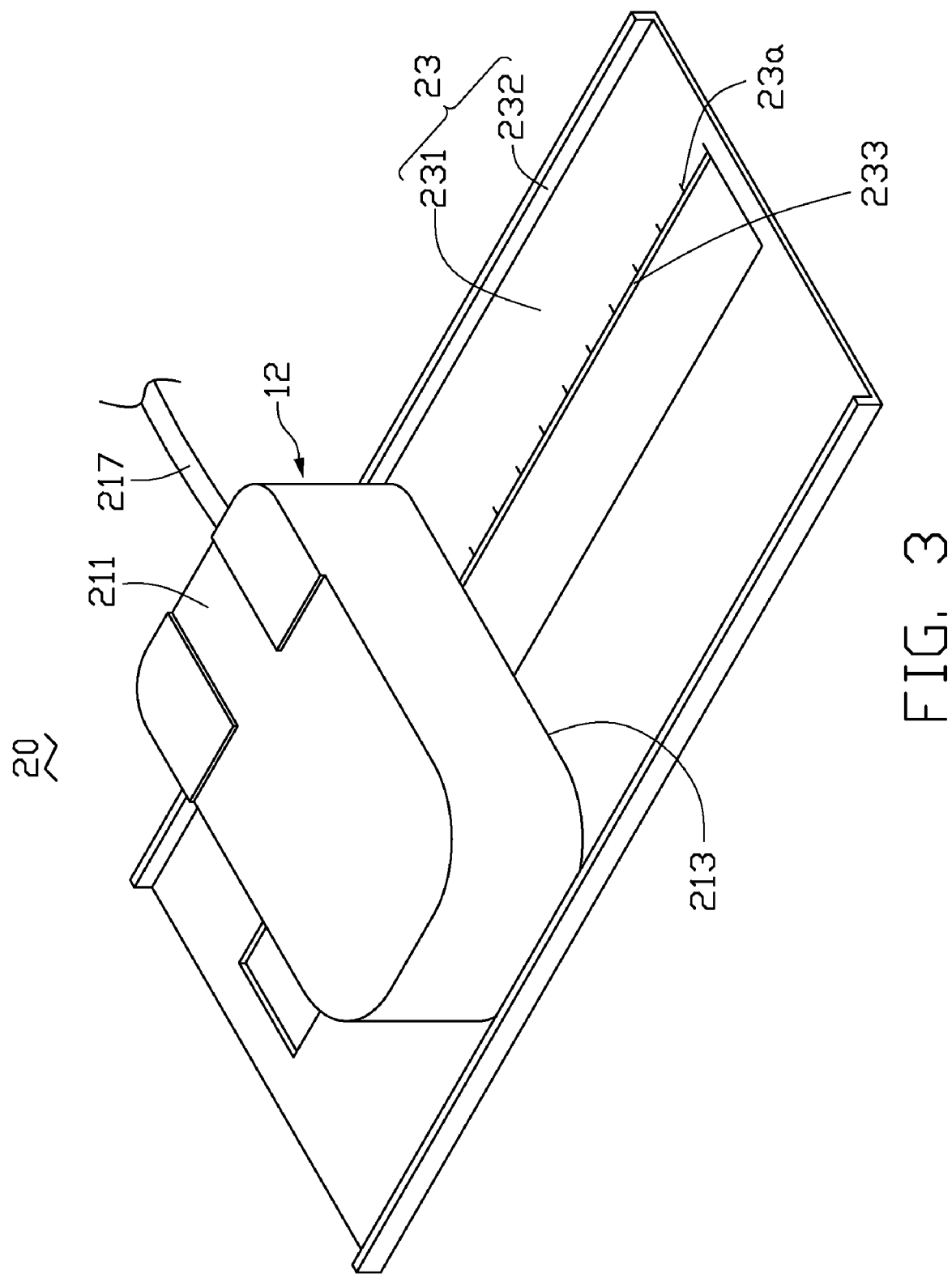
FIG. 3 is isometric view of a mouse according to a second embodiment.

Referring to FIG. 3, a mouse 20 according to a second embodiment is shown. Differences between the mouse 10 of the first embodiment and the mouse 20 of this embodiment are that the mouse 20 of this embodiment further includes a guiding member 23. The object to be scanned is placed under the guiding member 23.

The guiding member 23 includes a bottom plate 231 and two perpendicular side plates 232 respectively connected to two ends of the bottom plate 231. The body 21 of the mouse 20 is positioned between the two side plates 232 and the second surface 213 contacts the bottom plate 231.

The bottom plate 231 defines a rectangular through hole 233 corresponding to the scanning window (not shown) on the second surface 213 of the mouse 20. Therefore, the object to be scanned is exposed to the scanning window. A plurality of alignment marks 23a is formed on a lengthwise edge of the bottom plate 231 around the through hole 233, allowing the mouse 20 to move along the array of alignment marks 23a so that the scanning window of the mouse 20 can be precisely aligned with the through hole 233.

Advantages of this embodiment is similar to that of the first embodiment.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mouse comprising:
   a body comprising a first surface, an opposite second surface, and a recess defined in the second surface; and
   a scanner received in the recess, the scanner comprising:
      a housing defining a scanning window;
      an optical scanning unit received in the housing, the optical scanning unit comprising:
         a plane light source attached to an inner wall of housing and adjacent to the scanning window for emitting light through the scanning window towards an object to be scanned;
         a reflector received in the housing and perpendicular to the plane light source for reflecting light from the object or the light source; and
         a lens module received in the housing for focusing the reflected light from the object, and
      an imaging sensor package received in the housing and configured for receiving the focused light and generating image data associated with the object.

2. The mouse as claimed in claim 1, further comprising a data sending module electrically connected to the imaging sensor package and configured for receiving the image data and sending out the image data.

3. The mouse as claimed in claim 1, wherein the housing includes a first portion and a second portion; the first portion defines a first opening and the second portion defines a second opening corresponding to the first opening; the first opening and the second opening cooperatively form the scanning window, the plane light source is attached to the inner wall of the second portion.

4. The mouse as claimed in claim 2, wherein the data sending module includes a control circuit and a cable; and the control circuit is configured for receiving the image data and sending out the image data via the cable.

5. The mouse as claimed in claim 2, wherein the data sending module includes a control circuit and a wireless sending unit; the control circuit is configured for receiving the image data and the wireless sending unit is configured for sending out the image data wirelessly.

6. The mouse as claimed in claim 1, wherein the plane light source includes a light diffusing plate and an array of light emitting diodes optically coupled to the light diffusing plate.

7. The mouse as claimed in claim 6, wherein the light diffusing plate includes a light incident surface facing the array of light emitting diodes and a light emitting surface perpendicularly connected to the light incident surface.

8. The mouse as claimed in claim 7, wherein a plurality of protrusions are formed the light emitting surface.

9. The mouse as claimed in claim 1, further comprising a guiding member, the guiding member comprising: a bottom plate defining a rectangular through hole; and two perpendicular side plates respectively connected to two ends of the bottom plate, the body positioned between the two side plates and the second surface slidable on the bottom plate, the scanning window facing toward the through hole.

10. The mouse as claimed in claim 9, wherein a plurality of alignment marks is formed on a lengthwise edge of the bottom plate around the through hole.

11. The mouse as claimed in claim 1, wherein the scanner further comprises a transparent plate for enclosing the scanning window.

12. A mouse comprising:
    a body comprising an upper surface, and a lower surface, the lower surface defining a scanning window,
    a click button arranged on the upper surface; and
    a scanner received in the body and exposed at the lower surface by the scanning window, the
    scanner comprising:
       a housing;
       a plane light source received in the housing and adjacent to the scanning window for illuminating an object to be scanned;
       a reflector received in the housing and perpendicular to the plane light source for reflecting light from the object or the light source;
       an imaging sensor received in the housing for capturing an image of the object; and
       a lens module received in the housing for directing reflected light from the object to the imaging sensor.

13. The mouse as claimed in claim 12, wherein the light source includes a light diffusing plate and an array of light emitting diodes optically coupled to the light diffusing plate.

14. The mouse as claimed in claim 12, further comprising a data sending module electrically connected to the imaging sensor and configured for receiving image data from the imaging sensor and sending out the image data.

15. The mouse as claimed in claim 14, wherein the data sending module includes a control circuit and a cable; and the control circuit is configured for receiving the image data and sending out the image data via the cable.

16. The mouse as claimed in claim 14, wherein the data sending module includes a control circuit and a wireless sending unit; the control circuit is configured for receiving the image data and the wireless sending unit is configured for sending out the image data wirelessly.

17. The mouse as claimed in claim 12, wherein the scanner further comprises a transparent plate for enclosing the scanning window.

18. The mouse as claimed in claim 17, further comprising a guiding member, the guiding member comprising: a bottom plate defining a rectangular through hole; and two perpendicular side plates respectively connected to two ends of the bottom plate, the body positioned between the two side plates and the second surface slidable on the bottom plate, the scanning window facing toward the through hole.

* * * * *